United States Patent

Tulpule

[11] Patent Number: 5,860,286
[45] Date of Patent: Jan. 19, 1999

[54] SYSTEM MONITORING REFRIGERATION CHARGE

[75] Inventor: Sharayu Tulpule, Farmington, Conn.

[73] Assignee: Carrier Corporation, Syracuse, N.Y.

[21] Appl. No.: 869,536

[22] Filed: Jun. 6, 1997

[51] Int. Cl.$^6$ .................................................. F25B 49/02
[52] U.S. Cl. ........................................................ 62/129
[58] Field of Search .......................... 62/125, 126, 127, 62/129; 702/33, 34; 706/15, 38, 41, 20, 23, 25

[56] References Cited

U.S. PATENT DOCUMENTS

| | | | |
|---|---|---|---|
| 4,660,386 | 4/1987 | Hansen et al. | 62/126 |
| 5,009,076 | 4/1991 | Winslow | 62/129 |
| 5,152,152 | 10/1992 | Brickner et al. | 62/126 |
| 5,260,526 | 11/1993 | Sirag | 187/127 |
| 5,333,240 | 7/1994 | Matsumoto et al. | 395/23 |
| 5,372,015 | 12/1994 | Suzuki et al. | 706/23 X |
| 5,398,516 | 3/1995 | Kuribara et al. | 62/129 |
| 5,539,385 | 7/1996 | Duff et al. | 340/626 |
| 5,586,445 | 12/1996 | Bessler | 62/129 X |
| 5,713,213 | 2/1998 | Nobuta et al. | 62/129 X |

*Primary Examiner*—Harry B. Tanner

[57] ABSTRACT

A refrigerant monitoring system for a heating or cooling system includes a neural network that is used to compute the refrigerant charge in at least one refrigeration circuit of the system. The neural network is trained to learn certain characteristics of the heating or cooling system during a development mode of operation. The thus trained neural network timely computes refrigerant charge during a run time mode of operation. Information as to the computed refrigerant charge being at variance with the nominal amount of refrigerant charge for at least one refrigeration circuit is made available for assessment during the run time mode of operation.

32 Claims, 8 Drawing Sheets

SYSTEM MONITORING REFRIGERATION CHARGE

BACKGROUND OF THE INVENTION

This invention relates to monitoring the operation of a heating or cooling system, and more specifically to monitoring the level of refrigerant charge present in the refrigeration circuit of any such system.

Many heating and/or cooling systems employ refrigeration circuits. Heat pumps, for instance, use a refrigeration circuit to absorb heat from beneath the ground that can be thereafter surrendered through a heat exchanger to air in a building that is to be heated by the heat pump. Chiller systems on the other hand absorb heat from water flowing through an evaporator so as to thereby chill the water. The chilled water is ultimately used to cool the air in a building by virtue of the chilled water absorbing heat from the air flowing through a heat exchanger. It is important that both the heat pump and the chiller have a sufficient or adequate charge of refrigerant in order to accomplish their respective functions.

It is also important to detect any change in refrigerant charge before the heating or cooling system has operated at an undercharged or overcharged condition for a prolonged period of time. In this regard such changes, if significant, could cause harm to the system. Any such change in refrigerant charge may also be potentially harmful to the atmosphere in the event that the change is attributable to a refrigerant leakage.

Heating or cooling systems have heretofore been equipped with a variety of alarms that may detect an inadequate refrigerant charge. For instance a chiller system equipped with alarms located primarily at the inlet side of one or more of the system's compressors may be triggered due to low refrigerant charge. These alarms may however also be triggered due to other problems occurring within the system. For example, alarms for monitoring suction pressure or suction temperature at the inlet of the compressor may also be triggered due to a stuck expansion valve or fan failure. These alarms may also not be triggered until a substantial amount of refrigerant has been lost. This would occur if the thresholds for the alarms were improperly set. For example, the alarms for monitoring suction pressure or suction temperature at the inlet of the compressor may be set too low.

It is to be noted that certain attempts have been made to define a variable limit for triggering the alarm of a particularly monitored refrigerant condition. For instance, the limit for the refrigerant pressure in the condenser unit in a chiller is varied for a particular load conditions in U.S. Pat. No. 5,539,385. This is, however, a varied limit for only a particular condition as opposed to monitoring a combination of conditions present within the chiller system.

It is an object of the invention to detect early loss of small amounts of refrigerant without reliance on individual thresholds of one or more alarms being exceeded.

It is another object of the invention to detect incremental changes in refrigerant charge without relying on one or more alarms that may be triggered for a variety of possible reasons.

SUMMARY OF THE INVENTION

The above and other objects are achieved by providing a refrigerant monitoring system with the capability of performing a collective analysis of a number of sensed conditions occurring within a heating or cooling system having at least one refrigeration circuit. The monitoring system first defines unique signatures in multidimensional space for the various sensed conditions during a development mode of operation. The unique signatures are preferably generated by a neural-network which constantly adjusts the signatures in multidimensional space for a variety of varying ambient and building load conditions that are experienced by the heating or cooling system for known amounts of refrigerant charge. In a preferred embodiment, the known refrigerant charges are the nominal refrigerant charge for a particular refrigeration circuit within a chiller, the nominal refrigerant charge plus thirty percent more refrigerant charge, and the nominal refrigerant charge less thirty percent less refrigerant charge. The unique signatures are preferably projected onto a cluster array within the neural-network wherein each node of the array contains stored weighted values defining a signature in multidimensional space for one of the particular refrigerant charges.

The monitoring system is also operative during the development mode to define certain weighted connections between the nodes of the cluster array and a series of nodes in an interpolation layer. The monitoring system also defines certain weighted connections between the nodes of the interpolation layer and an output node during this phase of the development mode. The output node produces refrigerant charge values for various sets of training data that are provided to the monitoring system. The weighted connections between the cluster array nodes, interpolation layer nodes and the output node are continuously adjusted until the refrigerant charge values produced at the output node substantially converge to known values of refrigerant charge for the provided training data. The finally adjusted weighted connections are stored for use by the monitoring system during a run time mode of operation.

In a preferred embodiment of the invention, refrigerant charge is monitored within a particular refrigeration circuit of a chiller. The monitoring system receives a set of data from eight sensors within the chiller during the run time mode of operation. Each set of data creates a signature or pattern in eight dimensional space. This signature is compared with eight dimensional signatures of the nodes of a cluster array defined during the development mode. Three nodes in the cluster array having eight dimensional signatures closest to the created signature are preferably chosen for further processing of their respective signatures. The processing is done on the basis of a relative valuation of the closeness of the created signature to each of the signatures in the selected three nodes. The processing of the selected node signatures will occur in a set of interpolation computations based on the weighted connections between the cluster array nodes and the interpolation nodes learned during the development mode. These computational results will be ultimately processed through an output node that will compute a value of refrigerant charges based on the computational results from the interpolation nodes and the weighted connections between the output node and the interpolation nodes learned during the development mode. A computed value will be produced at the output node for each set of data received from the eight sensors. These computed values are stored and averaged over a predetermined period of time. The resulting average refrigerant charge is displayed as an output of the monitoring system. The thus displayed charge can be used to indicate whether or not the chiller system should be shut down for appropriate servicing due to the displayed refrigerant charge condition.

BRIEF DESCRIPTION OF THE DRAWINGS

The invention will become more apparent by reading a detailed description thereof in conjunction with the following drawings, wherein.

DESCRIPTION OF THE PREFERRED EMBODIMENT

Figure 1:
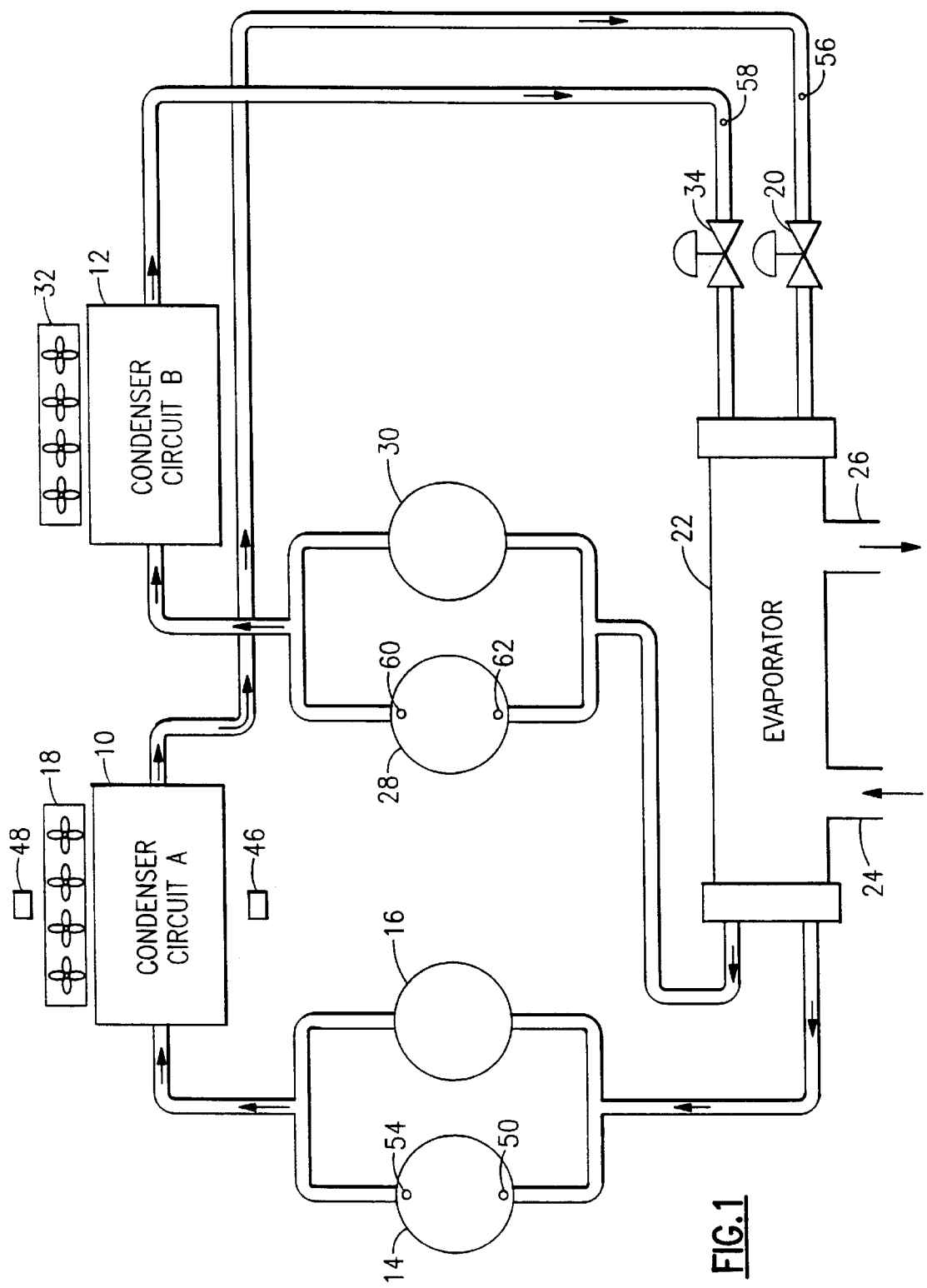
FIG. 1 is a schematic diagram of a chiller including two separate chiller refrigeration circuits.

Referring to FIG. 1, a chiller is seen to include two separate refrigeration circuits "A" and "B", each of which has a respective condenser 10 or 12. In order to produce cold water, the refrigerant is processed through chiller components in each respective refrigeration circuit. In this regard, refrigerant gas is compressed to high pressure and high temperature in a pair of compressors 14 and 16 in circuit A. The refrigerant is allowed to condense to liquid giving off heat to air flowing through the condenser 10 by virtue of a set of fans 18. The condenser preferably allows the liquid refrigerant to cool further to become subcooled liquid. This subcooled liquid passes through an expansion valve 20 before entering an evaporator 22 commonly shared with refrigeration circuit B. The refrigerant evaporates in the evaporator 22 absorbing heat from water circulating through the evaporator 22 from an input 24 to an output 26. The water in the evaporator gives off heat to the refrigerant and becomes cold. The cold or chilled water ultimately provides cooling to a building. The cooling of the building is often accomplished by a further heat exchanger (not shown) wherein circulating air gives off heat to the chilled or cold water. It is to be noted that refrigerant is also compressed to high pressure and temperature through a set of compressors 28 and 30 in refrigeration circuit B. This refrigerant is thereafter condensed to liquid in condenser 12 having a set of fans 32 associated therewith. The condenser 12 preferably allows the liquid refrigerant to cool further to become a subcooled liquid. This subcooled liquid refrigerant passes through expansion valve 34 to the evaporator 22.

Figure 2:
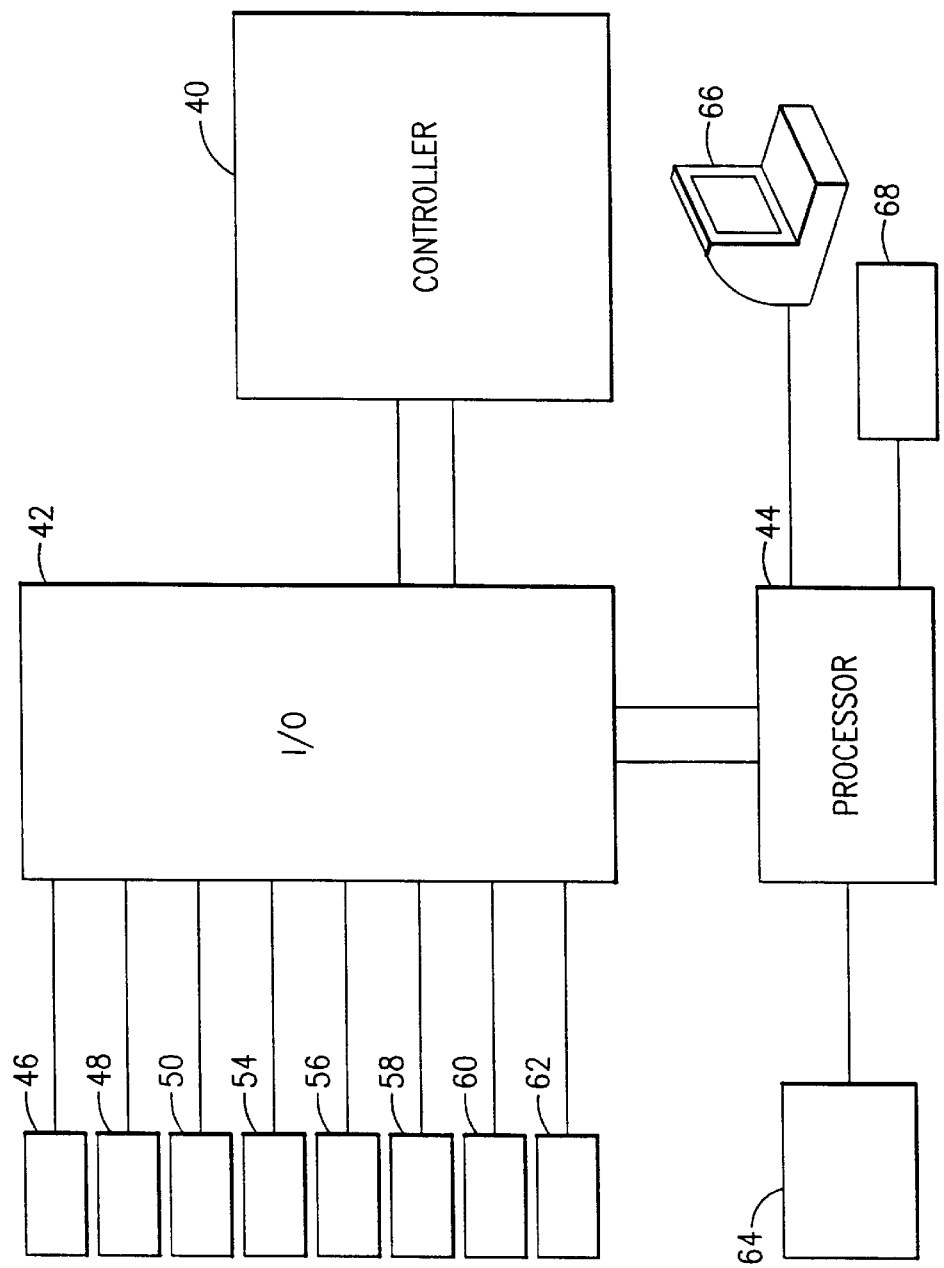
FIG. 2 is a block diagram of a controller for the chiller of FIG. 1 plus a processor containing neural-network software for computing refrigerant charge in one refrigeration circuit of the chiller.

Referring to FIG. 2, a controller 40 controls the expansion valves 20 and 22 as well as the fan sets 18 and 32 governing the amount of air circulating through the condensers 10 and 12. The controller turns the compressors 14, 16, 28 and 30 on and off in order to achieve certain required cooling of the water flowing through the evaporator 22. A set of sensors located at appropriate points within the chiller of FIG. 1 provide information to the controller 40 through an I/O bus 42. Eight of these sensors are also used to provide information to a processor 44 associated with the I/O bus 42. In particular, a sensor 46 senses the temperature of the air entering the condenser 10 within refrigeration circuit A. A sensor 48 senses the temperature of the air leaving this condenser. These temperatures will be referred to hereinafter as "CEAT" for condenser entering air temperature, and "CLAT" for condenser leaving air temperature. The processor 44 also receives the compressor suction temperature of compressor 14 as measured by a sensor 50 positioned at the inlet side of this compressor. The processor 44 furthermore receives the compressor discharge temperature for this same compressor via a sensor 54 located at the discharge outlet side of this compressor. The compressor suction temperature as sensed by sensor 50 will be hereinafter referred to as "ST_A" whereas the compressor discharge temperature as sensed by sensor 54 will be hereinafter referred as "DT_A". The processor also receives a subcooled refrigerant temperature from a sensor 56 located above expansion valve 20. This particular temperature will be hereinafter referred to as "SUBCA".

The processor 44 also receives certain sensed values from refrigeration circuit B. In this regard, the subcooled refrigerant temperature from a sensor 58 located upstream of expansion valve 34 is provided to the processor 44. This will be referred to hereinafter as "SUBCB". The compressor discharge temperature of compressor 28 as measured by a sensor 60 and the compressor suction temperature of this compressor as measured by a sensor 62 are also provided to the processor 44. The compressor discharge temperature of compressor 28, as measured by sensor 60, will be hereinafter referred to as "DT_B". The compressor suction for compressor 60, as sensed by sensor 62, will be hereinafter referred to as "ST_B".

The processor 44 is seen to be connected to a display 64 in FIG. 2 which may be part of a control panel for the overall chiller. The display is used by the processor 44 to provide refrigerant charge information to anyone viewing the control panel of the chiller of FIG. 1.

The processor 44 is also directly connected to a keyboard entry device 66 and to a hard disc storage device 68. The keyboard entry device may be used to enter training data to the processor for storage in the storage device 68. As will be explained hereinafter, training data may also be directly downloaded from the controller 40 to the processor for storage in the storage device 68. This training data is thereafter processed by neural-network software residing within the processor 44 during a development mode of operation.

Figure 3:
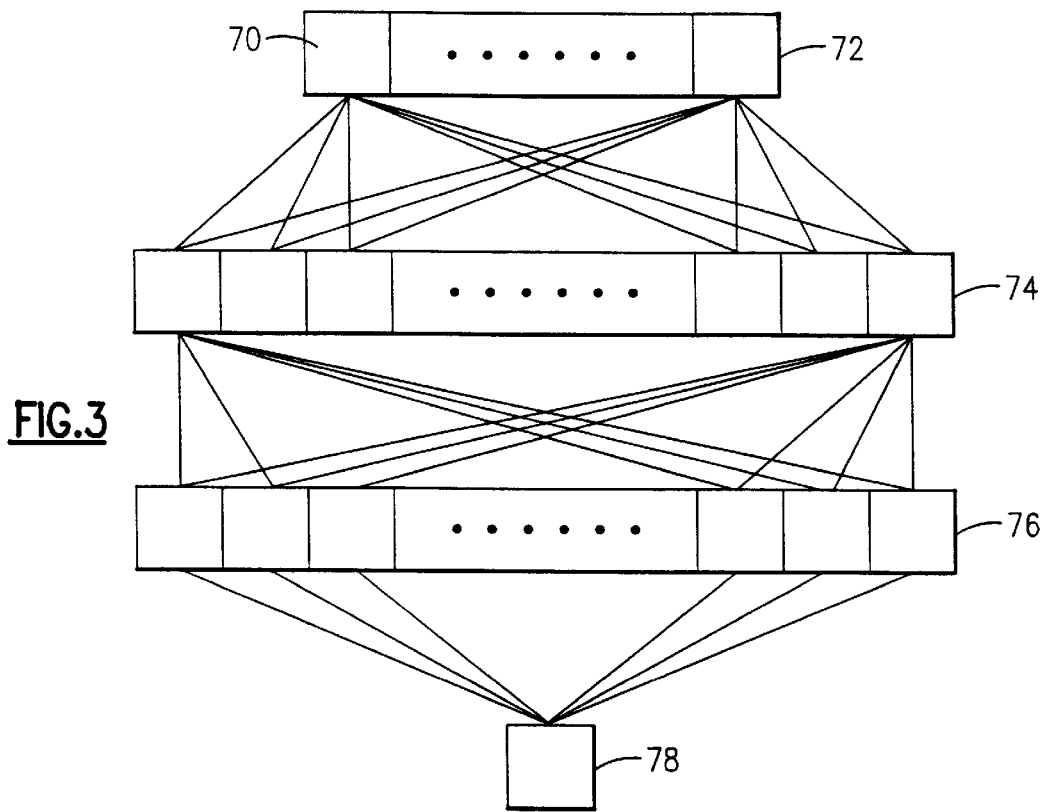
FIG. 3 is a diagram depicting the connections between nodes in various layers of the neural-network software.

The neural-network software executed by the processor 44 is a massively parallel, dynamic system of interconnected nodes such as 70 illustrated in FIG. 3. The nodes are organized into layers such as an input layer 72, one or more hidden layers such as 74, an interpolation layer 76, and an output layer 78 consisting of one output node. The nodes have full or random connections between the successive layers. These connections have weighted values that are defined during the development mode of operation.

Figure 4:
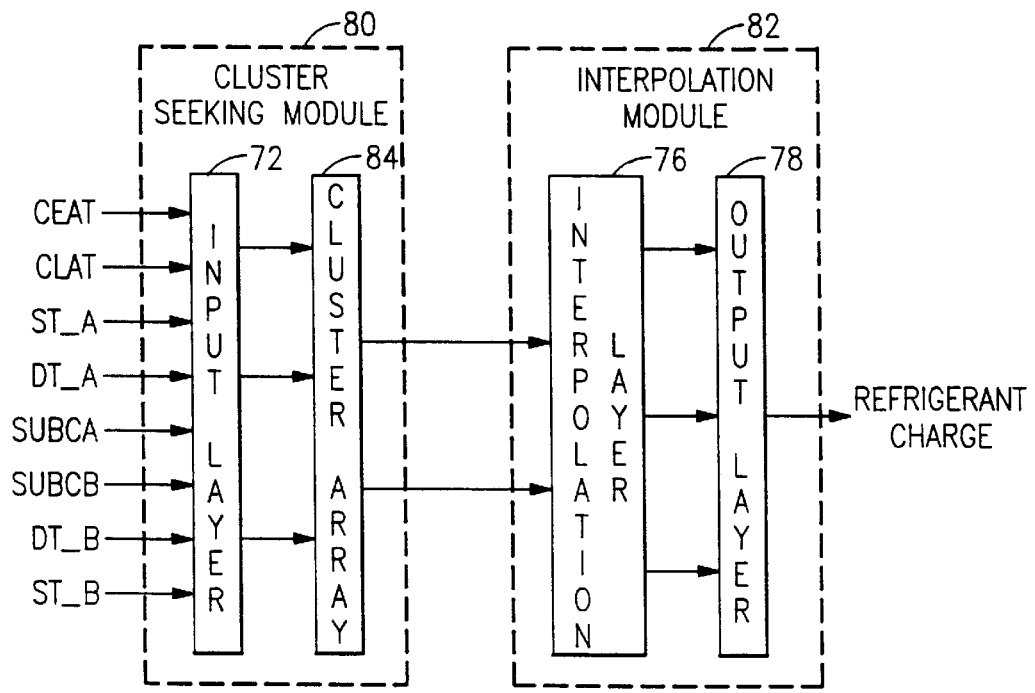
FIG. 4 is a block diagram depicting certain arrays of the nodes of FIG. 3.

Referring to FIG. 4, the neural-network architecture that is particularly utilized by the processor 44 for computing refrigerant charge is shown. This architecture is seen to consist of two separate modules, the first of which is identified as a cluster seeking module 80 and the second of which is identified as an interpolation module 82. The cluster seeking module 80 includes the input layer 72 comprising a one by eight node array representing the eight sensor measurements from the sensors 46 through 62. These measurements are CEAT, CLAT, ST_A, DT_A, SUBCA, SUBCB, DT_B and ST_B. The second array or layer within the cluster seeking module 80 is identified as a cluster array 84. It is a four by sixteen array with four hidden rows and sixteen nodes in each row. The interpolation module which receives the outputs from the cluster seeking module consists of the interpolation layer 76 which is a one by sixteen array having sixteen nodes. The last layer in the interpolation module 82 is the output layer 78 which is a one by one array comprising one node.

As will be explained in detail hereinafter, the processor 44 is operative during a development mode of operation to first adapt and thereafter modify weights associated with the nodes of the cluster array 84. This is accomplished by iteratively processing training data through module 80 and adjusting the weights of the nodes in the cluster array. After the nodes in the cluster array have been finally adjusted, the processor will proceed to the training of module 82. The processor is in this instance operative to adapt and thereafter modify weighted connections between the nodes of the cluster array and the nodes of the interpolation layer 76. The processor is furthermore operative to adapt and thereafter modify weighted connections between the nodes of the interpolation layer and the single node at the output layer 78. This training of the module 82 is accomplished by iteratively processing training data through both modules 80 and 82. Once the neural-network has been thus constructed, it will be stored for use during the run time mode of operation.

Figure 5A:
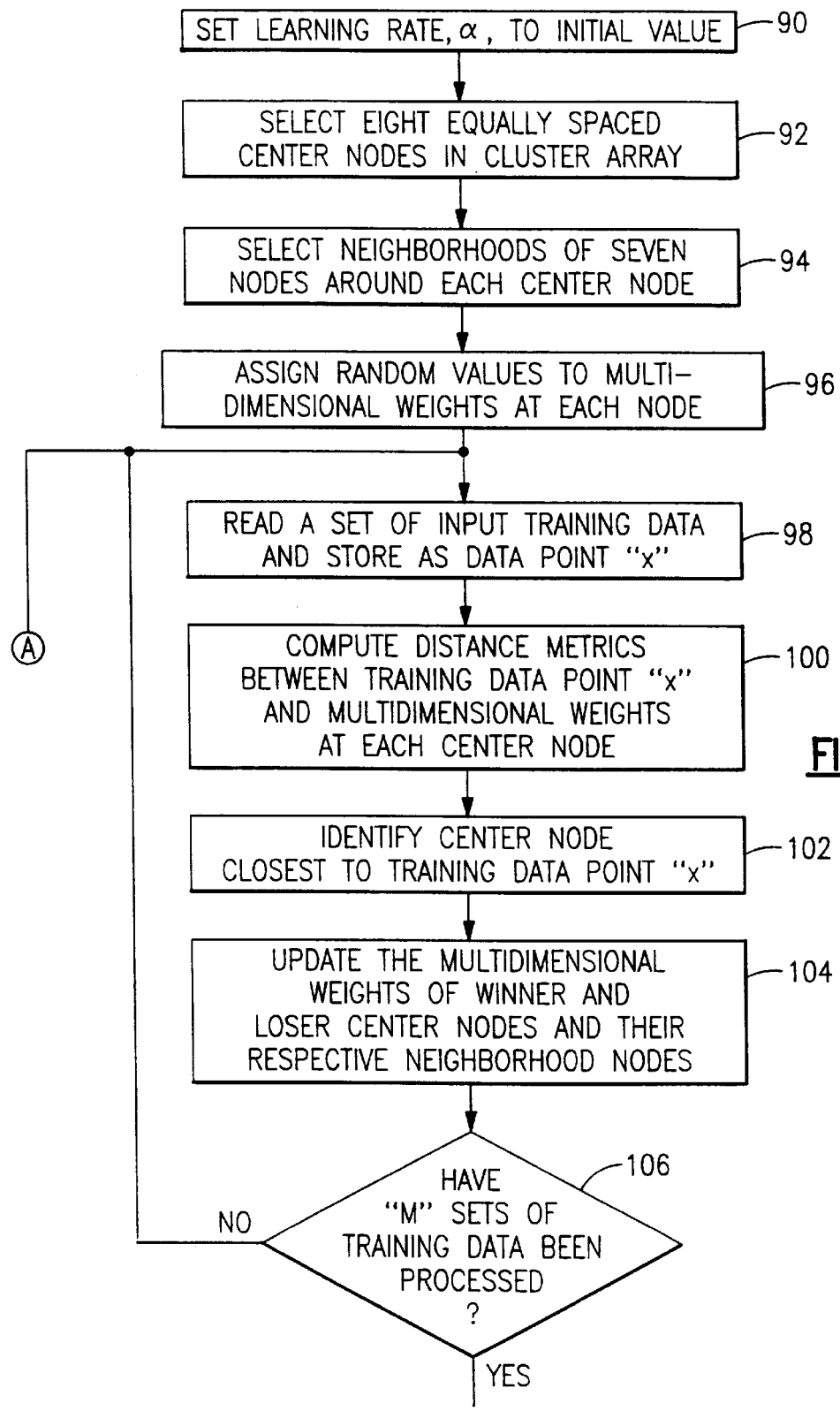
FIGS. 5a and 5b show a flow chart of a neural-network process executed by the processor of FIG. 2 during a development mode of operation.
Figure 5B:
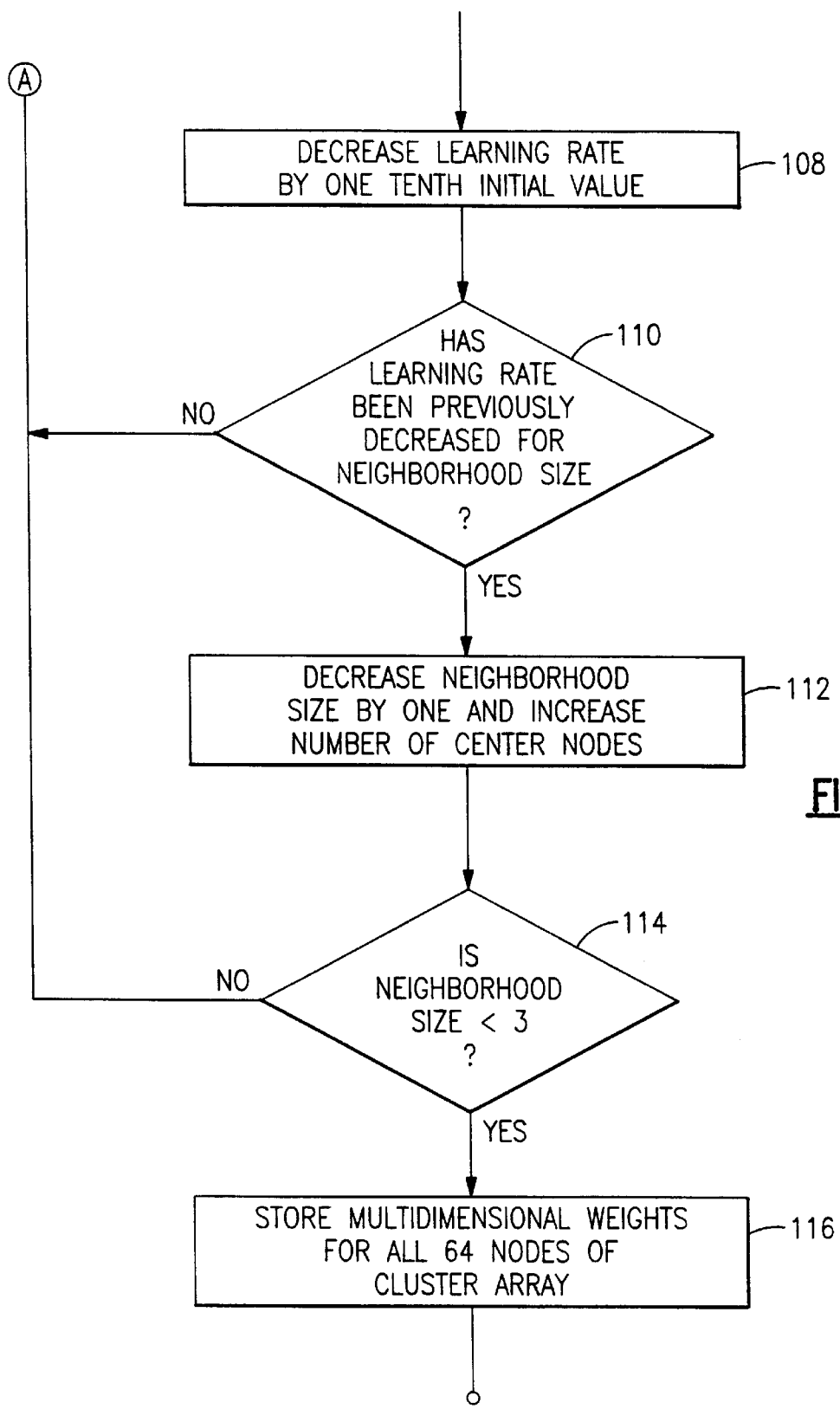
Figure 6:
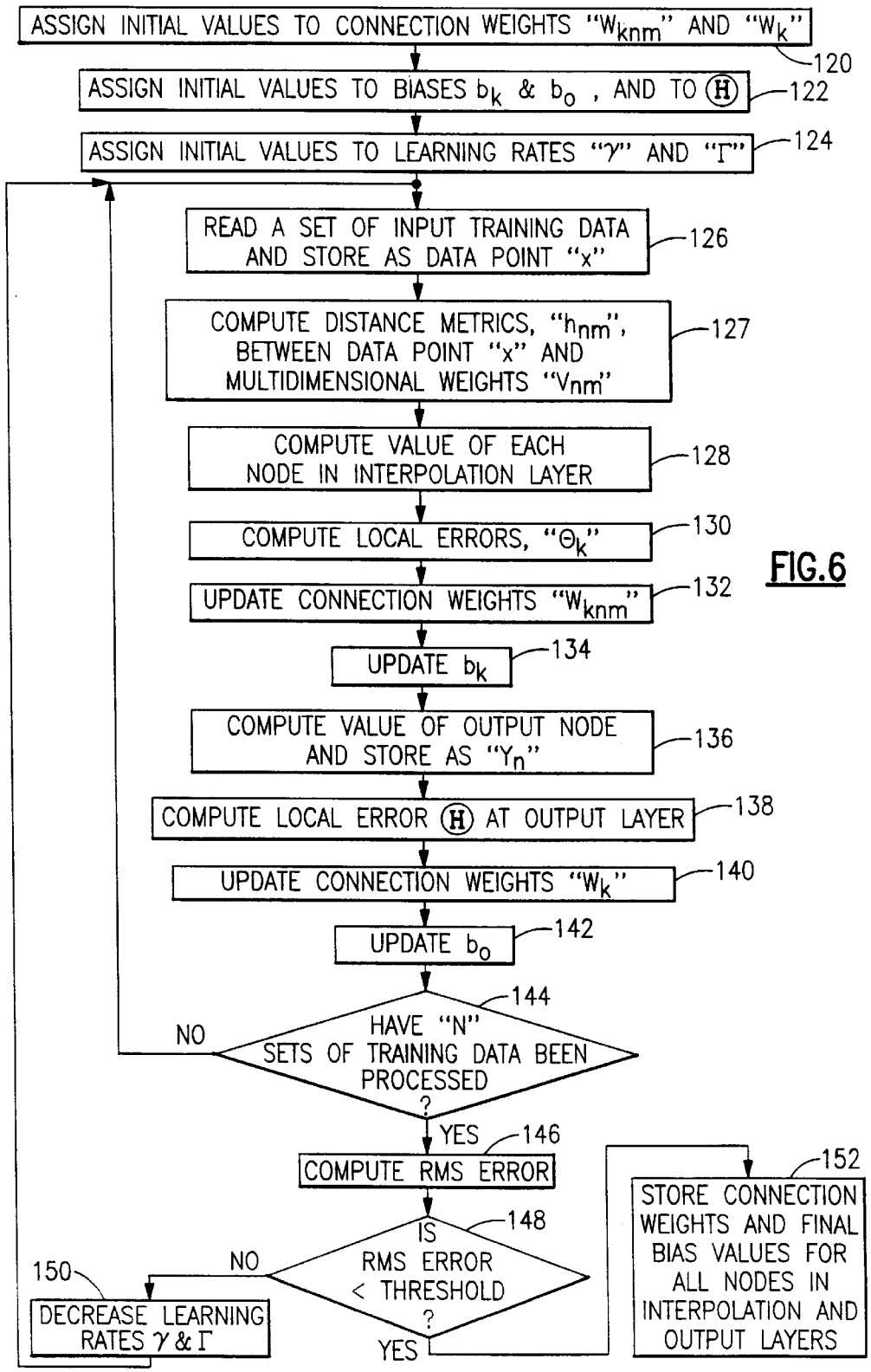
FIG. 6 is a flow chart of another neural-network process executed by the processor of FIG. 2 during a development mode of operation.

Referring now to FIGS. 5a and 5b, a flow chart of the processor 44 executing the neural-network training software during the first phase of a development mode of operation is illustrated. The first phase of the development mode of operation will result in training the neural-network to learn the weights of the nodes in the cluster array 84. This training begins with a step 90 wherein the initial value of a learning rate variable, α, is established. As will be explained hereinafter, the initial value of this variable is decreased on successive iterations of certain computational steps in the neural-network training software. The initial value that is selected must be greater than zero and less than one.

The processor proceeds to a step 92 and selects eight center nodes that are equally spaced within the cluster array 84. The processor 44 now proceeds to a step 94 and selects a neighborhood of seven nodes around each selected center node. The processor next proceeds to a step 96 and assigns random values to the center nodes and to the surrounding neighborhood nodes. It is to be appreciated that each node will preferably have been assigned random values for eight separate conductor dimensions in eight dimensional space. Each of these eight coordinate dimensions will also be used to define a measured coordinate value corresponding to one of the eight sensor values. The processor 44 will proceed to a step 98 and read a set of input training data from the storage device 68. The set of input training data will consist of eight values previously obtained from each of the eight sensors 46–62 when the chiller was subjected to a particular ambient and a particular load condition with a known amount of refrigerant in refrigeration circuit A. It is to be noted that the refrigeration circuit B will also have a known amount of refrigerant. This known amount will preferably be maintained at the nominal amount of refrigerant charge for this refrigeration circuit.

It is to be appreciated that the chiller will also have been subjected to a considerable number of other ambient and load conditions with known amounts of refrigerant in circuit A in each load situation. To subject the chiller to different load conditions, hot water may be circulated through the evaporator 22 so as to simulate various building load conditions. The known amounts of refrigerant charge will preferably be the nominal charge of refrigerant in circuit A, the nominal charge plus thirty percent more refrigerant charge and the nominal charge amount less thirty percent less refrigerant charge. These plus and minus thirty percentage amounts of refrigerant were chosen because each represents a rather large variance from nominal refrigerant charge that define a suitable range of refrigerant amounts to be monitored. The processor 44 will have received values from the eight sensors 46–72 for each particular combination of ambient condition, building load condition and known refrigerant charge experienced by the chiller. These values will preferably be provided via the controller 40 which periodically reads the sensors as the chiller is being subjected to the particular ambient and building load conditions for a particular refrigerant charge. These eight values will have been stored in the storage device as the eight respective values of a set of training data. The processor 44 will also receive a typed in input of the known refrigerant charge from the keyboard device 66. This refrigerant charge is preferably stored in conjunction with the training data set of eight respective sensor values received from the controller when the chiller was noted to have the particularly known refrigerant charge.

Referring to step 98, the eight values for a set of training data will be read from storage device 68 and stored as eight coordinate values $x_1$, $x_2$, $x_3$, $x_4$, $x_5$, $x_6$, $x_7$, $x_8$ for a training data point "x" each time this step is executed. An indexed count of the number of sets of training data thus read from the storage device will be maintained by the processor. These coordinate values will be stored in the input layer 72 within the processor's internal memory. The processor will proceed to a step 100 to compute distance metrics between the training data point "x" and the multidimensional weights of the center nodes. It is to be appreciated that each assigned center node, "i", within the cluster array will have eight individual weighted values assigned to the eight dimensional coordinates that were used to define the coordinate values of the training data point "x". These weighted values will initially be assigned random values that can be identified as $v_{i1}$, $v_{i2}$, $v_{i3}$, $v_{i4}$, $v_{i5}$, $v_{i6}$, $v_{i7}$, $v_{i8}$ for a multidimensional weight value "$v_i$". Since there are initially eight center nodes, the value of "i" will be one through eight for these center nodes. This distance metric is the Euclidean distance as calculated by the formula:

$$d_i = \sqrt{(x_1 - v_{i1})^2 + (x_2 - v_{i2})^2 + \ldots + (x_8 - v_{i8})^2}$$

The processor 44 proceeds to identify the center node that is closest to the input training data set in a step 102 by determining which of the distances, $d_i$, is the minimum.

The processor now proceeds to a step 104 to update the weight values of the multidimensional weight values "$v_i$" of the winner and loser center nodes and the multidimensional weight values of their associated neighborhood nodes. For the winning center node and its neighborhood nodes, the weight values of each dimensional coordinate value are adjusted according to $$v_{new} = v_{old} + \alpha(x - v_{old})$$

It is to be noted that α is the learning rate which was set to an initial value in step 90. No adjustments are made to the weight values of the losing center nodes and their associated neighborhood nodes.

The processor proceeds to a step 106 and inquires as to whether "M" sets of training data have been processed. This is a matter of checking the indexed count of the read sets of training data established in step 98. In the event that further sets of training data are to be processed, the processor 44 will proceed back to step 98 and again read a set of training data and store the same as the current "x" coordinate values. The indexed count of the thus read set of training data will be incremented. It is to be appreciated that the processor 44 will repetitively execute steps 98 through 106 until all "M" sets of training data have been processed. This is determined by checking the indexed count of training data sets that have been read in step 98. It is to be appreciated that the "M" sets of training data that are referred to herein as being processed will either be all or a large portion of the total number of sets of training data originally stored in the storage device 68. These "M" sets of training data will be appropriately stored in addressable storage locations within the storage device so that the next set can be accessed each time the indexed count of training data sets is incremented from the first count to the $M^{th}$ count.

When all "M" training data sets have been processed, the processor will reset the indexed count of read sets of training data. The processor will thereafter proceed to a step 108, and decrease the learning rate, "α", by one tenth of its initial value. The processor next inquires as to whether the learning rate was decreased for the particular neighborhood size. If not, the processor will proceed back to step 98 wherein all "M" sets of training data will again be successively accessed for the same neighborhood size but at the decreased value of the learning rate.

The processor will again decrease the learning rate in step 108 when all of the sets of training data have been processed. Since the learning rate will have been previously decreased for the particular neighborhood size, the processor will proceed through step 110 to step 112 and decrease the neighborhood size by one. The processor will also now select a different set of center nodes that are equally spaced from each other based on the decreased neighborhood size.

The processor will proceed to inquire in step 114 as to whether the neighborhood size is less than three. If the neighborhood size is three or more, the processor will proceed back to step 98 and again process all "M" sets of training data for the new neighborhood size and the new learning rate. When the learning rate has been further adjusted once for the particular neighborhood size, then the processor will again execute steps 110, 112 and 114. It is to be appreciated that at some point all neighborhood sizes from seven down to and including three will have been processed. The learning rate will have been decreased down to one tenth of its initial value. At this point, a uniform representation of all input training data will have been achieved for all the nodes of the cluster array 84. When this occurs, the processor will proceed from step 114 to a step 116 and store the final eight coordinate values for each of the sixty-four nodes in the cluster array. Each final eight coordinate values will define a multidimensional weight "$v_{nm}$" for a particularly identified node where "n" identifies the column and "m" identifies the row in which the node can be found in the cluster array.

The processor 44 will now proceed to the second phase of the development mode of operation. In this particular phase, the neural-network will learn specific weight values for the connections between the cluster array and the nodes in the interpolation layer. It will also learn specific weight values for the connections between the nodes of the interpolation layer and the single node in the output layer. The processor begins this process by assigning initial values to the connection weights "$w_{knm}$" and "$w_k$" in a step 120. The processor proceeds in a step 122 to assign initial values to biases "$b_k$" and "$b_o$". These biases are used in computing respective output values of nodes in the interpolation layer and the output layer. The initial values for these biases are fractional numbers between zero and one. The processor also assigns an initial value to a variable Θ in step 122. This initial value is preferably a decimal value such as one tenth that is closer to zero than to one. Further values will be computed for $b_k$, $b_o$ and Θ during the second phase of the development mode. The processor next proceeds to a step 124 and assigns initial values to learning rates γ and Γ. These learning rates are used respectively in interpolation layer and output layer computations as will be explained hereinafter. The initial values for the learning rates are decimal numbers greater than zero and less than one.

The processor 44 next reads the values of a set of input training data and stores the same as the coordinate values for a data point "x" in much the same way as it previously read and stored a set of training data in step 98. The processor will proceed to a step 127 and compute a distance metric "$h_{nm}$" between the "x" coordinate values and each of the eight stored coordinate values for the multidimensional weight of each node in the cluster array. The eight stored coordinate values for the multidimensional weight "$v_{nm}$" of each node will be $v_{nm1}$, $v_{nm2}$, $v_{nm3}$, $v_{nm4}$, $v_{nm5}$, $v_{nm6}$, $v_{nm7}$, and $v_{nm8}$. The distance metric is the Euclidian distance calculated as follows:

$$h_{nm} = \sqrt{(x_1 - v_{nm1})^2 + (x_2 - v_{nm2})^2 + \ldots + (x_8 - v_{mn8})^2}$$

The processor will proceed to a step 128 and compute the output value, $z_k$, for each node in the interpolation layer 76. The output value $z_k$ is preferably computed as the hyperbolic tangent function of a variable "t" expressed as:

$$z_k = (e^t - e^{-t})/(e^t + e^{-t})$$

$$\text{wherein } t = \sum_{m=1}^{4} \sum_{n=1}^{16} w_{knm} h_{nm} + b_k.$$

where, $h_{nm}$=computed distance metric of step 127 for the cluster node in the $m^{th}$ row and $n^{th}$ column, $w_{knm}$=connection weight for the $k^{th}$ interpolation layer node connected to the cluster array node in the $m^{th}$ row and $n^{th}$ column; and $b_k$=bias for $k^{th}$ interpolation layer node.

The processor now proceeds to a step 130 and computes a local error $θ_k$ for each interpolation layer node connection to the output node according to the formula:

$$θ_k = (1+z_k) \cdot (1-z_k) \cdot (Θ \cdot w_k),$$

where, $z_k$=interpolation node value for $k^{th}$ node computed in step 128;

Θ=either the initially assignment error value of step 122 or an error value computed during a previous processing of the sets of training data; and $w_k$=connection weight for the output node connected to $k^{th}$ interpolation node.

The processor proceeds to step 130 and updates the weights of the connections between the cluster array nodes and the interpolation layer nodes as follows:

$$w_{knm,new} = w_{knm,old} + \Delta w_{knm,old},$$

$$\Delta w_{knm,old} = γ θ_{k,new} h_{nm}$$

where, $h_{nm}$=computed distance metric of step 127 for the cluster node in the $M^{th}$ row and $n^{th}$ column;

where γ is the scalar learning rate factor;

where $\theta_{k,new}$ is the scaled local error calculated in step 130;

The processor next proceeds to step 134 and updates each bias $b_k$ for a respective interpolation node as follows:

$$b_{k,new}=b_{k,old}+\gamma\theta_{new}.$$

The processor now proceeds to a step 136 to compute the output from the single node of the output layer 76. This output node value, y, is preferably computed as a hyperbolic tangent function of the variable "u" expressed as:

$$y=(e^u-e^{-u})/(e^u+e^{-u})$$

$$\text{where } u = \sum_{m=1}^{16} w_k z_k + b_0$$

where $z_k$=interpolation node value, k=1,2, . . . 16;

$w_k$=connection weight for the output node connected to $k^{th}$ interpolation node; and $b_o$=bias for output node.

The computed value of "y" is stored as the "$n^{th}$" computed output of the output node for the "$n^{th}$" set of processed training data. This value will be hereinafter referred to as "$y_n$". It is to be noted that the known refrigerant value for the "$n^{th}$" set of training data is also stored as "$Y_n$" so that there will be both a computed output "$y_n$" and a known output "$Y_n$" for each set of training data that has been processed. As has been previously discussed, the known refrigerant value is preferably stored in association with the particular set of training data in the disc storage device 68. This allows the known refrigerant value to be accessed and stored as "$y_n$" when the particular set of training data is processed.

The processor proceeds in a step 138 to calculate the local error Θ at the output layer as follows:

$$\Theta=(y-Y)\cdot(1+y)\cdot(1-y),$$

The processor proceeds to step 140 and updates the weight of the interpolation node connections to the output node using the back propagation learning rule as follows:

$$w_{k,new}=w_{k,old}+\Delta w_{k,old},$$

$$\Delta w_{k,old}=\Gamma\Theta_{new}z_k.$$

where, k denotes the connection to the $k^{th}$ node of the interpolation layer.

where, Γ =learning rate either initially assigned in step 124 or computed during a previous processing of the node.

where, $\Theta_{new}$=local error computed in step 138.

The processor next updates the bias $b_o$, in a step 142 as follows:

$$b_{0,new}=b_{0,old}+\Gamma\Theta_{new}.$$

The processor now proceeds to inquire in a step 144 as to whether "N" sets of training data have been processed. The number "N" will be the total number of sets of training data set aside in the storage device 68 that are to be processed for phase two of the development mode. It is to be noted that the number "N" can be the same number of training data sets processed in phase one of the development mode. If it is, then the "M" sets of training data, as stored in the storage device 68 for phase one, would again be addressed and processed in steps 126–144. On the other hand, if one wished to use a different group of sets of training data from the storage device 68, then this group would need to be stored in appropriate addressable storage locations so that they could be sequentially addressed and processed in steps 126–144. In either event, the processor will perform the various computations of steps 126 through 142 until "N" sets of training data have been processed. At this time, the processor will proceed to step 146 and compute the RMS Error value between the stored values of refrigerant charge computed in step 136 and the corresponding known values of refrigerant charge for each such computed refrigerant charge.

$$RMS \text{ Error} = \left[\left(\sum_{n=1}^{N}(y_n-Y_n)^2\right)/N\right]^{-1/2}$$

Inquiry is made in step 148 as to whether the calculated RMS Error value computed in step 146 is less than a threshold value of preferably 0.001. When the RMS Error is not less than this particular threshold, the processor will proceed along the no path to a step 150 and decrease the respective values of the learning rates γ and Γ. These values may be decreased in increments of one tenth of their initially assigned values.

The processor proceeds to again process the "N" sets of training data, performing the computations of steps 127 through 146 before again inquiring as to whether the newly computed RMS error is less than the threshold of "0.001". It is to be appreciated that at some point the computed RMS error will be less than this threshold. This will prompt the processor to proceed to store all computed connection weights and all final bias values for each node in the interpolation layer 76 and the single node in the output layer 78.

Referring to FIG. 4, all node values for the cluster array 84 and the interpolation layer 76 as well as all weighted connection values with respect to the nodes of the cluster array, interpolation layer and the single node of the output array will have been stored in the storage device 68 following the development mode of operation. As will now be explained, these stored values are to be used during a run time mode of operation of the processor to compute refrigerant charge within the refrigeration circuit "A".

Figure 7A:
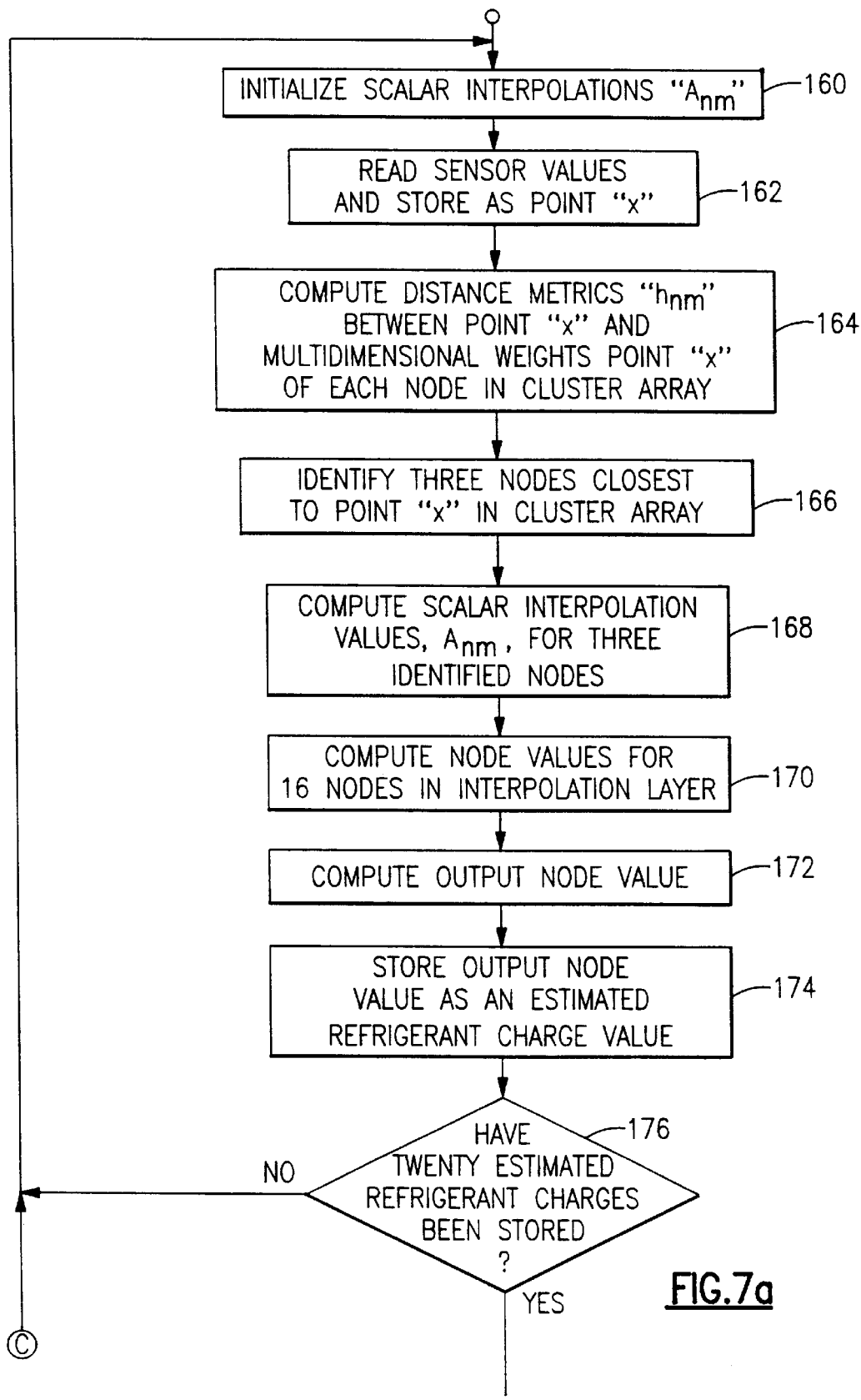
FIGS. 7a and 7b show a flow chart of a neural-network process executed by the processor of FIG. 2 using the arrays of FIG. 4 during a run time mode of operation.
Figure 7B:
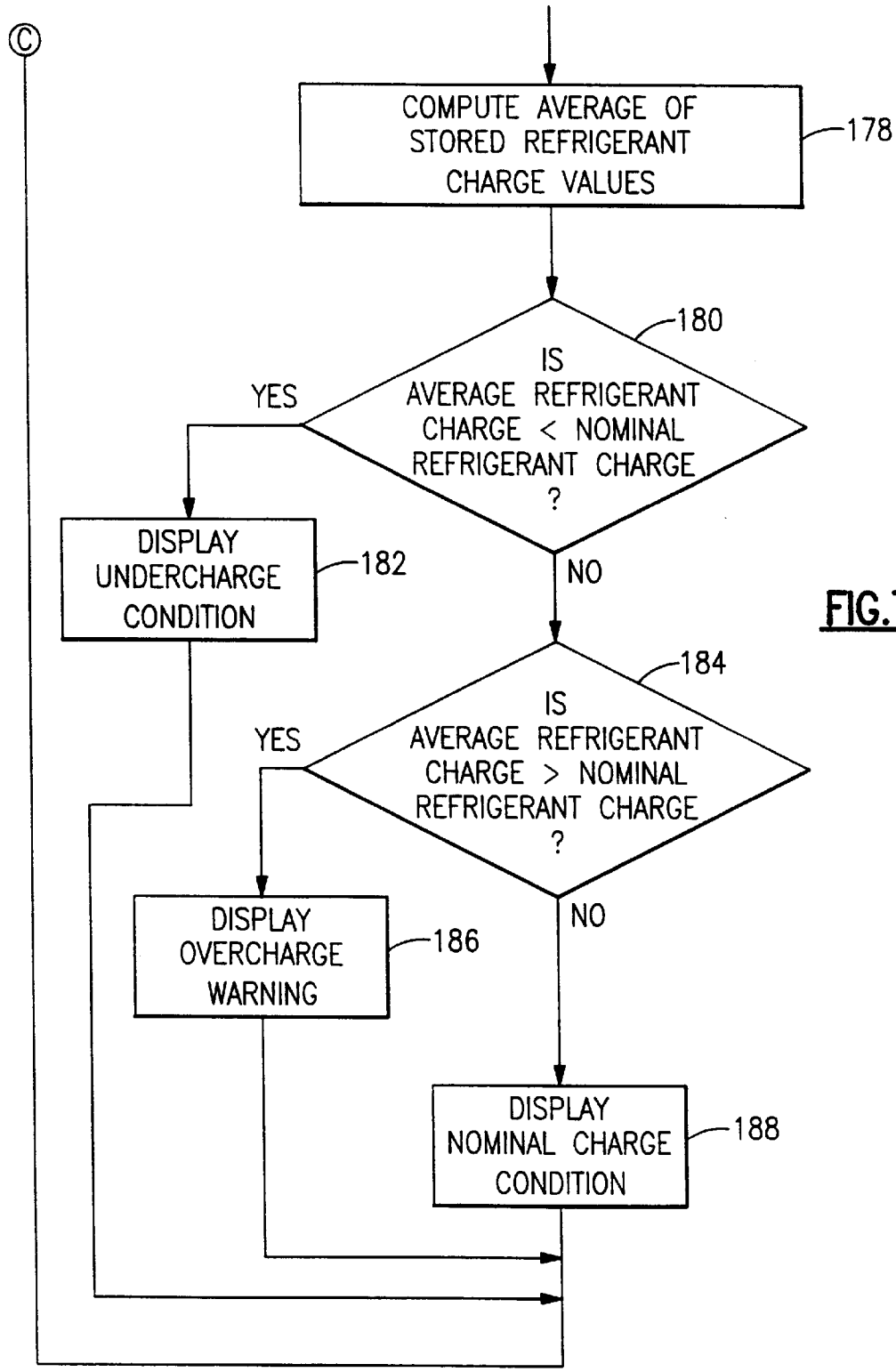

Referring to FIGS. 7a and 7b, the run time mode of operation of the processor 44 begins with a step 160 wherein certain scalar interpolation values are initialized to zero. As will be explained hereinafter, some of these values are set equal to non-zero values during the run time mode of operation. The processor proceeds to a step 162 to read measured values of temperature obtained from the sensors 46 through 62. In this regard, the processor will await an indication from the controller 40 of the chiller that a new set of sensor values has been read by the controller 40 and stored for use by both the controller and the processor. This occurs periodically as a result of the controller collecting and storing the sensor information each time a predetermined period of time elapses. The period of time is preferably set at three minutes. These sensor values will be stored as coordinate values for a point "x" in eight dimensional space.

The processor proceeds to a step 164 wherein the stored "x" coordinate values defined as $x_1, x_2, x_3, x_4, x_5, x_6, x_7, x_8$. are used to compute distance metrics with respect to the multidimensional weight "$v_{nm}$" for each node in the cluster array identified by a column index "n" and a row index "m"

in the cluster array 84. The distance, "$h_{nm}$", for each node is computed as follows:

$$h_{nm} = \sqrt{(x_1 - v_{nm1})^2 + (x_2 - v_{nm2})^2 + \ldots + (x_8 - v_{nm8})^2}\,,$$

for $n = 1$ to $16$, $m = 1$ to $4$, where, $v_{nm1}, \ldots v_{nm8}$ are the stored multidimensional weight values for the multidimensional node weight of the node in the $m^{th}$ row and "$n^{th}$" column of the cluster array.

The processor proceeds after having calculated the distance metrics for the present "x" coordinate values relative to each node to a step 166 to identify three nodes that have the minimum distance metrics. These nodes are denoted, respectively, as nodes a, b, and c, and their distance values are noted as follows:

for node a: D1=min ($h_{nm}$), for node b: D2=min ($h_{nm}$), for all n,m excluding the node a, for node c: D3=min ($h_{nm}$), for all n,m excluding the nodes b and c.

The processor proceeds in a step 168 to define scalar interpolation values $A_{nm}$ for each of the above nodes of the cluster array. The $A_{nm}$ value for the node "a" is set equal to one. The scalar interpolation value for the node "b" is calculated as being equal to D1/(D1+D2). The scalar interpolation value for the node "c" is calculated as being equal to D1/(D1+D3). For all other nodes, the value of $A_{nm}$ is maintained at zero.

The processor proceeds to step 170 and computes the node values, $z_k$, for the sixteen respective nodes in the interpolation layer 76. Each node value $z_k$, is preferably computed as the hyperbolic tangent function of the variable "t" as follows:

$$z_k = (e^t - e^{-t})/(e^t + e^{-t})$$

$$\text{wherein } t = \sum_{m=1}^{4} \sum_{n=1}^{16} A_{nm} w_{knm} h_{nm} + b_k$$

where, $z_k$=output of the $k^{th}$ node in the interpolation layer, k=1,2, . . . 16;

$h_{nm}$=distance metric for cluster node in the $m^{th}$ row and $n^{th}$ column;

$w_{knm}$=connected weight for $k^{th}$ interpolation layer node connected to cluster node in the $m^{th}$ row and $n^{th}$ column;

$b_k$=stored bias for $k^{th}$ interpolation layer node;

$A_{nm}$=scalar interpolation value for node in the $m^{th}$ row and $n^{th}$ column of the cluster array.

The processor proceeds from step 170 to step 172 wherein an output node value "y" is preferably computed as the hyperbolic tangent function expressed as:

$$y = (e^u - e^{-u})/(e^u + e^{-u}).$$

$$\text{wherein } u = \sum_{k=1}^{16} w_k z_k + b_0$$

where, $z_k$=interpolation node value computed in step 170, k=1,2 . . . 16;

$w_k$=connection weight for $k^{th}$ interpolation node connected to output node;

$b_o$=stored bias for output node;

The processor now proceeds to a step 174 and stores the calculated value, "y", of the output node as an estimated refrigerant charge. Inquiry is next made in step 176 as to whether twenty separate estimated refrigerant charges have been stored in step 174. In the event that this number of refrigerant charges has not been stored, the processor will proceed back to step 160 and again initialize the scalar interpolations $A_{nm}$ before reading the next set of sensor values. As has been previously noted, the next set of sensor values will be made available to the processor following a timed periodic reading of the sensors by the controller 40. This timed periodic reading by the controller is preferably every three minutes. These new sensor readings will be immediately read by the processor 44 and the computational steps 164, 166, 168, 170 and 172 will again be performed thereby allowing the processor to again store another value of estimated refrigerant charge in step 174. It is to be appreciated that at some point in time, the processor will have noted in step 176 that twenty separate sets of sensor values will have been processed. This will prompt the processor to proceed to a step 178 where the average of all estimated refrigerant charge values stored in step 174 will be computed. The processor will proceed in step 180 to compare the computed average refrigerant charge with the known nominal refrigerant charge for the particular refrigeration circuit A within the chiller system of FIG. 1. This known nominal refrigerant charge will have been stored in the processor's memory for use during the run time mode of operation. In the event that the average estimated refrigerant charge is less than the known nominal refrigerant charge, then the processor will proceed to a step 182 and display an undercharged condition preferably indicating either the amount by which the refrigerant charge has varied from nominal or the actual computed charge. This display preferably appears on the display 66 of the control panel. In the event that the average estimated charge is equal to or greater than the nominal refrigerant charge, then the processor will proceed to a step 184. Inquiry is made in step 184 as to whether the average refrigerant charge is greater than the known nominal refrigerant charge. In the event that the answer to this inquiry is yes, then the processor will proceed to a step 186 and display an overcharge condition which may include the display of the amount by which the refrigerant charge exceeds the nominal charge or the actual computed charge. The processor will otherwise proceed to a step 188 in the event that the average estimated refrigerant charge is equal to the nominal refrigerant charge. The nominal charge condition will be displayed on the display 64.

Referring to display steps 182, 184 or 188, the processor will exit from the display of one of the noted refrigerant charge conditions and return to step 160. The processor will again initialize the scalar interpolation values, preparatory to reading a new set of sensor values in step 162. These values will be read into the memory of the processor 44 when indicated as being available from the controller 40. The processor will ultimately compute twenty new estimated refrigerant charge values. Each of these newly computed refrigerant charge values will replace a previously stored refrigerant charge value in the processor's memory that had been computed for the previous averaging of stored refrigerant charge values. The processor will thereafter compute a new average refrigerant charge sixty minutes from the previously computed average refrigerant charge. In this regard, the processor will have successively read and processed twenty new sets of sensor information each set being successively read in three minute intervals. The newly displayed average refrigerant charge condition will be displayed on the display 66.

It is to be appreciated from the above that a display is made on an on-going basis as to the refrigerant charge level present in the chiller circuit A of the chiller system in FIG. 1. The thus displayed refrigerant charge will accurately reflect any refrigerant charge of the chiller circuit A of the chiller system that lies between minus thirty percent of nominal refrigerant charge to plus thirty percent of refrigerant charge for this circuit. The computed and displayed refrigerant charge will be accurate to within finely granulated increments of five to seven percent of the nominal refrigerant charge value. As a result of this visual display of information, any operator of the chiller system can note when a problem is occurring with respect to the level of refrigerant charge and take appropriate action.

It is to be appreciated that a particular embodiment of the invention has been described. Alterations, modifications and improvements may readily occur to those skilled in the art. For example, the processor could be programmed to timely read data from sensors without relying on the controller. The chiller could also be varied with potentially less or more sensor values being used to define the neural-network values during the development mode and to ultimately compute real time refrigerant charges during the run time mode of operation. The amount of refrigerant in refrigeration circuit B could also be allowed to vary along with the amount of refrigerant in refrigeration circuit A with the neural network being trained in response to known amounts of refrigerant in each circuit to produce a single node output for the combined amounts of refrigerant in both circuits. Alternatively, a second output node could be introduced into the neural network. The neural network would be trained to produce separately computed amounts of refrigerant for the respective circuits in each respective output node. Accordingly, the foregoing description is by way of example only and the invention is to be limited by the following claims and equivalents thereto:

What is claimed is:

1. A process for monitoring the refrigerant charge in at least one refrigeration circuit of a heating or cooling system comprising the steps of:

reading values of sensed conditions occurring in the heating or cooling system wherein the values are produced by a plurality of sensors positioned at various locations within the heating or cooling system;

processing the read values of the sensed conditions occurring in the heating or cooling system through a neural network so as to produce a computed refrigerant charge for at least one refrigeration circuit of the heating or cooling system that is based on the read values of sensed conditions;

comparing the computed refrigerant charge with a nominal refrigerant charge for at least one refrigeration circuit of the heating or cooling system; and transmitting a status message as to the amount of refrigerant charge in at least one refrigeration circuit of the refrigeration circuit in response to said step of comparing the computed refrigerant charge with the nominal refrigerant charge.

2. The process of claim 1 wherein the neural network comprises a first array of nodes wherein each node in the first array contains stored values that have been learned by the neural network for particular amounts of refrigerant charge in at least one refrigeration circuit of the heating or cooling system and wherein said step of processing the read values of the sensed conditions through a neural network comprises the step of:

determining the proximity of the read values of sensed conditions occurring in the heating or cooling system to the stored learned values at each of the nodes in the first array; and identifying a number of nodes in the first array that are closest to the read values of sensed conditions occurring in the heating or cooling system based upon the determined proximity of the read values of sensed conditions to the stored learned values of the nodes.

3. The process of claim 2 wherein the neural network further comprises an array of interpolation nodes wherein each interpolation node is connected to the nodes in the first array through weighted connections that have been previously learned by the neural network, said process further comprising the step of:

computing values at each interpolation node based upon the values of the weighted connections of each interpolation node to the identified number of nodes in the first array.

4. The process of claim 3 wherein the neural network further comprises at least one output node that is connected to each interpolation node through weighted connections that have been previously learned by the neural network, said process further comprising the step of:

computing an output refrigerant charge value based upon both the values of the weighted connections of the output node to each interpolation node and the computed values of each interpolation node.

5. The process of claim 2 wherein the particular amounts of refrigerant charge in at least one refrigeration circuit include at least two amounts of refrigerant charge wherein one of the two amounts of refrigerant charge is the nominal amount of refrigerant charge in at least one refrigeration circuit of the heating or cooling system and the other amount of refrigerant charge is below the nominal amount of refrigerant charge.

6. The process of claim 2 wherein the particular amounts of refrigerant charge in at least one refrigeration circuit include at least two amounts of refrigerant charge wherein one of the two amounts of refrigerant charge is the nominal amount of refrigerant charge in at least one refrigeration circuit of the heating or cooling system and the second amount lies below the nominal amount of refrigerant charge.

7. The process of claim 1 wherein said step of reading values of sensed conditions occurring in the heating or cooling system comprises the steps of:

reading the value of at least one sensed condition occurring with respect to at least one compressor in at least one refrigeration circuit of the heating or cooling system;

reading the value of at least one sensed condition occurring with respect to a heat exchanger in at least one refrigeration circuit of the heating or cooling system; and reading the value of at least one sensed temperature condition of the refrigerant downstream of the heat exchanger and upstream of an expansion valve in the refrigeration circuit of the heating or cooling system.

8. The process of claim 7 wherein said step of reading the value of at least one condition occurring with respect to at least one compressor in at least one refrigeration circuit comprises the steps of:

reading the compressor suction temperature at the inlet of the compressor; and reading the compressor discharge temperature at the outlet of the compressor.

9. The process of claim 7 wherein said step of reading the value of at least one sensed condition occurring with respect to at least one heat exchanger in at least one refrigeration circuit of the heating or cooling system comprises the steps of:

reading the temperature of air before entering the heat exchanger; and reading the temperature of the air leaving the heat exchanger.

10. The process of claim 7 further comprising the steps of:

reading the value of at least one sensed condition occurring with respect to at least one compressor in at least a second refrigeration circuit of the heating or cooling system; and reading the value of at least one sensed condition of a refrigerant in the second refrigeration circuit upstream of an expansion valve for the second refrigeration circuit within the heating or cooling system.

11. A process for learning the characteristics of a heating or cooling system so as to predict the refrigerant charge in at least one refrigeration circuit of the heating or cooling system, said process comprising the steps of:

storing a plurality of sets of data for sensed conditions occurring within the heating or cooling system when the system is subjected to various load and ambient conditions for known amounts of refrigerant charge in one or more refrigeration circuits of the system; and repetitively processing a number of the stored sets of data through a neural network so as to teach the neural network to accurately predict known refrigerant charges for the particular sets of data in at least one refrigeration circuit whereby the neural network may be used thereafter to process sensed conditions occurring within the heating or cooling system for unknown refrigerant charges so as to produce a computed refrigerant charge in at least one refrigeration circuit for the sensed set of conditions.

12. The process of claim 11 wherein the neural network comprises a plurality of nodes arranged in a first array wherein each node has a set of weighted values assigned thereto, and wherein the neural network further comprises a plurality of interpolation nodes in a second array wherein the interpolation nodes in the second array have weighted connections to the nodes in the first array and an output node for computing refrigerant charge, the output node having weighted connections to the interpolation nodes in the second array.

13. The process of claim 12 further comprising the step of:

adjusting the weighted connections between the nodes of the first array and the interpolation nodes in the second array in response to the repetitive processing of the number of stored sets of data; and adjusting the weighted connections between the interpolation nodes of the second array and the output node in response to the repetitive processing of the number of stored sets of data; and computing new values of refrigerant charge based upon the adjusted weighted connections whereby the adjusted weighted connections between all nodes eventually produce a computed refrigerant charge that converges to the known value of refrigerant charge for the sets of data being respectively processed through the neural network.

14. The process of claim 11 wherein said step of storing a plurality of sets of data for sensed conditions occurring within the heating or cooling system comprises the steps of:

storing each set of data as a plurality of values representing sensed values generated by sensors within the heating or cooling system; and storing the known refrigerant charge present in the heating or cooling system when the sensed values were generated by the sensors.

15. The process of claim 14 wherein said step of processing a number of stored sets of data through a neural network so as to teach the neural network to predict the known refrigerant charges comprises the steps of:

(a) reading a set of data and storing the read set of data as a set of coordinate dimensions in multidimensional space;

(b) identifying a plurality of nodes in the first array of nodes that possess sets of weighted values close to the set of coordinate dimensions in multidimensional space;

(c) adjusting the sets of weighted values at the identified nodes in the first array whereby the adjusted sets of values are adjusted as a function of the difference between the set of weighted values at each identified node and the coordinate dimensions of the read set of data.

16. The process of claim 15 wherein the sets of weighted values at the identified nodes in the cluster array are adjusted as a function of the value of a learning rate that is multiplied times the difference between the sets of old weighted values at each identified node and the coordinate dimensions values of the read set of data.

17. The process of claim 15 wherein said "a", "b" and "c" steps are repeated until a predetermined number of sets of data stored in the storage device have been processed and wherein said process further comprises the steps of:

(d) reducing the value of the learning rate; and (e) inquiring as to whether the value of the learning rate has reached a predetermined value.

18. The process of claim 17 wherein said steps of "a", "b", "c", "d" and "e" are repeated until such time as the learning rate has reached the predetermined value, said process furthermore comprising the step of:

storing the finally adjusted weighted values at all nodes in the first array when the value of the learning rate has reached the predetermined value.

19. The process of claim 12 further comprising the step of:

reading a set of data;

adjusting the defined plurality of connections between the nodes of the first array and the interpolation nodes in the second array in response to the read set of data; and adjusting the defined plurality of connections between the interpolation nodes of the second array and the output node in response to the read set of data whereby the adjusted connections between all nodes eventually produce computed refrigerant charges that converge to the known values of refrigerant charges for the sets of data being repetitively processed.

20. The process of claim 11 wherein said step of storing a plurality of sets of data for sensed conditions occurring within the heating or cooling system comprises the steps of:

storing each set of data as a plurality of values representing sensed values generated by sensors within the heating or cooling system for a known refrigerant charge; and storing the known refrigerant charge that was present in at least one refrigeration circuit in the heating or cooling system when the sensors generated the particular set of values in association with the respective set of stored sensed values generated by the sensors whereby the known refrigerant charge can be associated with the respective stored set of sensed values.

21. The process of claim 20 wherein said step of storing each set of data as a plurality of values representing sensed values generated by sensors within the heating or cooling system comprises the steps of:

storing at least one sensed value generated by a sensor mounted at the inlet side of a compressor within the heating or cooling system;

storing at least one sensed value generated by a sensor mounted at the outlet side of the compressor;

storing at least one sensed value generated by a sensor measuring the temperature of air entering a heat exchanger within the heating or cooling system; and storing at least one sensed value generated by a sensor measuring the temperature of air leaving a heat exchanger within the heating or cooling system.

22. The process of claim 21 wherein said step of storing each set of data as a plurality of values representing sensed values generated by sensors within the heating or cooling system comprises the steps of:

storing at least one sensed value of refrigerant temperature generated by a sensor mounted relative to an expansion valve within the heating or cooling system.

23. A process for monitoring the refrigerant charge present in at least one refrigeration circuit of a heating or cooling system comprising the steps of:

repetitively reading values of certain sensed conditions produced by a plurality of sensors positioned at various locations within the heating or cooling system;

storing each set of read values in a predetermined manner so that each stored value in a set of read values defines a coordinate dimension in multidimensional space;

processing each stored set of values through a neural network whereby a computed refrigerant charge is produced at the output of the neural network for each stored set of read values;

storing each computed refrigerant charge produced at the output of the neural network for each set of values processed through the neural network; and computing an average of the stored computed refrigerant charges after a predetermined number of computed refrigerant charges have been produced at the output node.

24. The process of claim 23 further comprising the step of:

comparing the computed average of the stored computed refrigerant charges with a known nominal refrigerant charge for at least one refrigeration circuit within the heating or cooling system; and generating a message when the computed average of the stored refrigerant charges is below the nominal refrigerant charge.

25. The process of claim 23 further comprising the step of:

comparing the computed average of the stored computed refrigerant charges with a known nominal refrigerant charge for at least one refrigeration circuit within the heating or cooling system; and generating a message when the computed average of the stored refrigerant charges is above the nominal refrigerant charge.

26. The process of claim 23 further comprising the step of:

repeating said steps of repetitively reading values of certain sensed conditions, storing each set of read values, and processing each stored set of read values through a neural network whereby a new computed refrigerant charge is produced for each processed set of read values; and storing each new computed refrigerant charge for each processed set of values; and computing an average of the stored new computed refrigerant charges.

27. The process of claim 23 wherein the neural network comprises a plurality of nodes in a first array of nodes wherein each node in the first array contains stored values that have been learned by the neural network and wherein said step of processing the read values of the sensed conditions through a neural network comprises the step of:

determining the proximity of the read and stored values of sensed conditions produced by the plurality of sensors in the heating or cooling system to the stored learned values at each of the nodes in the first array; and identifying a number of nodes in the first array that are closest to the read and stored values of sensed conditions produced by the plurality of sensors in the heating or cooling system based upon the determined proximity of the read and stored values of sensed conditions to the stored learned values of these nodes.

28. The process of claim 27 wherein the neural network further comprises an array of interpolation nodes wherein each interpolation node is connected to the nodes in the first array through weighted connections that have been previously learned by the neural network, said process further comprising the step of:

computing values at each interpolation node based upon the values of the weighted connections of each interpolation node to the identified number of nodes in the first array.

29. The process of claim 28 wherein the neural network further comprises at least one output node that is connected to each interpolation node through weighted connections that have been previously learned by the neural network, said process further comprising the step of:

computing an output refrigerant charge value based upon the values of the weighted connections to each interpolation node and the computed values of each of the interpolation nodes in the first array.

30. The process of claim 23 wherein the neural network has previously learned neural network values for at least two refrigerant charges in at least one refrigeration circuit of the heating or cooling system wherein one of the two refrigerant charges is the nominal refrigerant charge for at least one refrigeration circuit of the heating or cooling system and the other refrigerant charge lies below the nominal refrigerant charge wherein said step of processing each set of read values through the network comprises:

using the set of read values of sensed conditions occurring in the heating or cooling system to interpolate between learned neural network values so as to produce the computed refrigerant charge.

31. The process of claim 23 wherein the neural network has previously learned neural network values for at least two refrigerant charges in at least one refrigeration circuit of the heating or cooling system wherein one of the two refrigerant charges is the nominal refrigerant charge and the other refrigerant charge lies above the nominal refrigerant charge for at least one refrigeration circuit of the heating or cooling system wherein said step of processing each set of read values through the neural network comprises:

using the set of read values of sensed conditions occurring in the heating or cooling system to interpolate between the learned neural network values so as to produce the computed refrigerant charge.

32. The process of claim 23 wherein the neural network has previously learned neural network values for at least three amounts of refrigerant charge in the refrigeration circuit wherein one of the three refrigerant charges is the nominal refrigerant charge for at least one refrigerant circuit of the heating or cooling system and the other two amounts of refrigerant charge lie to either side of the nominal refrigerant charge wherein said step of processing each set of read values through the neural network comprises the step of:

using the set of read values of sensed conditions occurring in the heating or cooling system to interpolate between the learned neural network values so as to produce the computed refrigerant charge.

* * * * *